US 6,690,985 B2

(12) United States Patent
Haller et al.

(10) Patent No.: US 6,690,985 B2
(45) Date of Patent: Feb. 10, 2004

(54) METHOD FOR THE HYBRID-AUTOMATED MONITORING OF PRODUCTION MACHINES

(75) Inventors: Martin Haller, München (DE); Norbert Haueis, Kareth (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 10/139,166

(22) Filed: May 6, 2002

(65) Prior Publication Data
US 2002/0165623 A1 Nov. 7, 2002

(30) Foreign Application Priority Data
May 4, 2001 (DE) .......................... 101 21 728

(51) Int. Cl.⁷ .................. G06F 17/40; G05B 11/01; G04F 10/00
(52) U.S. Cl. ................ 700/108; 700/14; 700/174; 702/176; 702/178; 702/187
(58) Field of Search .............. 700/12, 14, 27, 700/51, 52, 78, 96, 108, 117, 174; 702/187, 176–178, 188

(56) References Cited

U.S. PATENT DOCUMENTS

| 5,091,859 A | * | 2/1992 | Zingher et al. ............. 700/117 |
| 5,446,672 A | * | 8/1995 | Boldys ........................ 700/174 |
| 5,696,702 A | * | 12/1997 | Skinner et al. ............. 702/186 |
| 5,870,696 A | * | 2/1999 | Randolph ................... 702/176 |
| 6,128,543 A | * | 10/2000 | Hitchner ..................... 700/108 |
| 6,356,859 B1 | * | 3/2002 | Talbot et al. ............... 702/188 |
| 2002/0026263 A1 | * | 2/2002 | Matsumoto ................. 700/174 |

FOREIGN PATENT DOCUMENTS

| DE | 197 13 917 A1 | 10/1998 |
| EP | 0 388 155 A2 | 9/1990 |
| EP | 0 403 175 B1 | 12/1990 |
| EP | 0 895 197 A1 | 2/1999 |
| WO | WO 90/15391 | 12/1990 |

OTHER PUBLICATIONS

Perkett, W. Real Time Factory Monitoring System, Nov. 1994, article appears in Advanced Semiconductor Manufacturing Conference and Workshop. 1994. ASMC 94. Proceedings. IEEE/SEMI. pp. 261–266.*
Tokuda, Hideyuki; Kotera, Makoto; Mercer, Clifford, A Real-Time Monitor for a Distributed Real-Time Operating System, 1988, ACM Press, pp. 68–77, ISBN:0-89791-296-9.*
Lüneburg, W. et al.: Rezeptbasierte Simulation zur Optimierung von Mehrzweckanlagen: Ein Anwendungsbeispiel [Recipe Based Simulation for the Optimization of Multi Purpose Plants: A Case Study], R. Oldenbourg Verlag, 1997, pp. 36–43.
Batz, T. et al.: "Objektorientierte Modellierung von Produktionsprozessen" [Object Oriented Modeling of Production Processes], Informatik Forsch. Entw., 1995, pp. 26–40.

* cited by examiner

Primary Examiner—Leo Picard
Assistant Examiner—Paul Rodriguez
(74) Attorney, Agent, or Firm—Laurence A. Greenberg; Werner H. Stemer; Gregory L. Mayback

(57) ABSTRACT

The method is for generating production information, such as capacity, reliability, or capacity utilization information, while hybrid-automated monitoring a production machine. An evaluation status model having a number of main statuses and an interpretation status model having a number of operating statuses are set up, with precisely one time account corresponding to each main status and transitions between operating statuses being established in accordance with events that can be picked up on the production machine. After that, operating statuses are assigned to main statuses and the time account of the main status applicable at a particular time is increased during the operation of the production machine by an amount that corresponds to the time period in which the production machine is in the main status concerned. Moreover, the number and sequence of changes in status are stored as a history.

8 Claims, 5 Drawing Sheets

METHOD FOR THE HYBRID-AUTOMATED MONITORING OF PRODUCTION MACHINES

BACKGROUND OF THE INVENTION

FIELD OF THE INVENTION

The invention relates to a method for the hybrid-automated monitoring of production machines, in which production information, in particular with respect to the capacity utilization, with respect to the reliability and/or with respect to the availability of the production machine, can be generated.

Methods for generating such production information in which evaluation statuses are assigned to a production machine are conceivable. In this case, an operator of the production machine has to switch back and forth between the various evaluation statuses. Depending on which evaluation status the production machine is in, an amount of time which corresponds to the time period in which the production machine is in the evaluation status concerned is credited to a time account assigned to the evaluation status. At the end of a production cycle, the counter readings of the various time accounts can be inquired. The productivity of the production machine is then obtained as a quotient of the amount of the time account, which corresponds to the production status of the production machine, and the overall running time of the production machine.

In the case of such a method, it is disadvantageous that manual inputs of an operator of the production machine are required for the transition between various evaluation statuses. Such manual inputs are often forgotten or even intentionally incorrectly made to make the production result look better.

According to an adaptive procedure, it is also conceivable for the transitions between various evaluation statuses to be undertaken in accordance with events that are picked up on the production machine. Many production machines are provided with status lamps, which switch back and forth between "red", "green", "yellow" and "red+yellow", depending on the operating status of the production machine. It is consequently conceivable for an evaluation status of "processing" and another evaluation status of "no processing" to be established, operating times of the production machine then being credited to a time account assigned to the evaluation status of "processing" when the status lamp is in the "green" status. Times are credited to the other time account, for the evaluation status of "no production", when the status indicator is in the "red", "yellow" or "red+yellow" statuses.

In the case of this adaptive procedure, it is advantageous that the automated registering of events allows an operator-independent crediting of time periods to the time accounts to be performed. Incorrect inputs are ruled out in this case. However, in the case of such adaptive methods, it is disadvantageous that the production information obtained is very inaccurate.

SUMMARY OF THE INVENTION

It is accordingly an object of the invention to provide a method for the hybrid-automated monitoring of production machines in which more accurate production information is obtained.

With the foregoing and other objects in view there is provided, in accordance with the invention, a method for operating a production machine in order to generate production information, which includes steps of:

setting up an evaluation status model having a plurality of evaluation statuses, each one of the plurality of the evaluation statuses having precisely one respective time account corresponding thereto;

setting up an interpretation status model having a plurality of statuses, transitions between the plurality of the statuses of the interpretation status model being established in accordance with events that can be picked up on the production machine;

assigning the plurality of the statuses of the interpretation status model to the plurality of the statuses of the evaluation status model; and while operating the production machine, increasing the time account of an applicable one of the plurality of the evaluation statuses, which is applicable at a particular time, by an amount corresponding to a time period in which the production machine is in the applicable one of the plurality of the evaluation statuses.

The method according to the invention has the step of setting up an interpretation status model. In this case, transitions between statuses of the interpretation status model are established in accordance with the events which can be picked up on the production machine. Furthermore, the step of assigning statuses of the interpretation status model to statuses of the evaluation status model is provided.

Unlike in the case of the known methods, in the case of the inventive procedure, a particularly fine breakdown of the evaluation status model can be performed. It is possible for the time periods in which the production machine is in the evaluation status concerned to be assigned particularly accurately.

In this case, events which cannot be included in the assignment when only an evaluation status model is being used can also advantageously be picked up on the production machine and used for the assignment according to the invention. The inventive provision of an additional interpretation status model of the production machine advantageously allows these events to be used to assign time periods, in which the production machine is in certain statuses, accurately to the correct evaluation status. As a result, the accuracy of the generation of production information is improved considerably.

In an advantageous development of the invention, when setting up the interpretation status model, transitions between the statuses are established in accordance with the inputs made by an operator of the production machine. If such inputs are provided as events which correspond to transitions between statuses of the interpretation status model, the accuracy of the production information generated according to the invention can be increased considerably. This is because it is not possible in the case of many production machines for all of the statuses of the production machine to be established just on the basis of events that can be picked up in an automated manner on the production machine itself. For example, it is possible with additional inputs of an operator to distinguish between the operation of a production machine in a test phase and the operation of the same production machine in a production phase.

According to the invention, both operator inputs and events automatically picked up on the production machine are used for determining the operating status of the production machine applicable at a particular time. The operating status can be derived by using the operator inputs and the automatically picked-up events from the interpretation status model of the production machine and can be accurately assigned to a corresponding main status of the evaluation status model. The respectively applicable main status of the production machine is accordingly dependent on the type and sequence of the events of the production machine that have occurred and on their interpretation and prioritizing according to the main status of the interpretation status model.

The manual inputs of the operator can in this case be described by a status model and can be used as events of the interpretation status model. The manual inputs of the operator of the production machine can be performed on a keypad, on a terminal, on a standard keyboard or on a touch-sensitive screen or touchscreen and can picked up from there.

This allows a further increase in the accuracy of the generated production information to be achieved.

According to a further advantageous configuration of the invention, signals can be picked up from sensors, in particular from buffer sensors, from pressure sensors and from indexers of the production machine. These signals can be used as events in the interpretation status model in order to further improve the accuracy of the assignment of the time periods, in which the production machine is in certain operating statuses, to the correct evaluation status. In this case, the signals of the sensors can assume discrete statuses and can be described by a sensor status model.

According to the invention, the information generated from the statuses of the sensors is advantageously used to accurately assign the time periods in which the production machine is in certain statuses to the correct evaluation status. A particularly fine breakdown of the evaluation statuses is made possible in this way.

In a further embodiment of the invention, signals are picked up from the machine control, in particular the signal lamps, of the production machine for generating production information. In this way, the operating statuses of the machine control or of the signal lamps can be described by a status model or by a signal lamp status model. The statuses of the machine control or of the signal lamps can be used as events in the interpretation status model.

In the case of existing production machines, the signal lamps often serve exclusively for visually checking the operating status of the production machine in the production line. According to the invention, the information obtained from the statuses of the signal lamps is advantageously used to accurately assign the time period in which a production machine is in a certain status to the correct evaluation status. A particularly fine breakdown of the evaluation statuses is possible in this way.

In the case of a further embodiment of the invention, the evaluation statuses and the time accounts of the evaluation statuses of the production machine are registered in a computer system connected to the production machine. The registered evaluation statuses are stored in the computer system, such that the time sequence of the evaluation statuses are taken into account.

This stored production information can be used reliably and conveniently for evaluation purposes, for example, for any desired time correlations, for production machine correlations and for characteristic value calculations.

The status models of the individual data sources of the production machine can only provide qualified information on the production status of the production machine. To register the status of the production machine correctly and as completely as possible, a combination of data sources is used. Moreover, the invention supports parallel use of different data sources.

The signal lamps are particularly suitable for registering the production status of the production machine. However, these lamps often do not correspond to the statuses that are required for an evaluation according to the evaluation status model. Moreover, they do not provide information when the production machine is switched off.

According to the invention, the status model of the operator panel is defined as the main status model. This has the effect that the status of the machine is only determined by means of the electrical signals when the manual input on the keypad prescribes "operation".

The invention allows a wide variety of machine components of production machines to be used for obtaining data. The invention permits production machines and machine components of production machines that conform to the "Semiconductor Equipment and Materials International Equipment Communications Standard/Generic Equipment Model" Standard or the "SECS/GM" Standard to be used for obtaining data. The invention also allows machines or machine components with proprietary interfaces and production machines that have no interface to be used for obtaining data.

According to the invention, different connections can be established between the machine components of the production machines and the software for monitoring and analysis.

The parameters supported by the invention are: operating statuses; calculated performance parameters, such as "Overall Equipment Effectiveness" or "OEE" or "Mean Time Between Failure" or "MTBF"; process parameters, such as pressure or temperature; product parameters, such as the device or the housing; and further influencing factors, such as the operator of the production machine or shift parameters.

The "TFM" software used provides a graphic instrument for modeling statuses which makes it possible for information to be presented in a way in which it is broken down between various data sources.

According to the invention, production information can be called up by the user in real time via the network, in the form of real-time graphics and summarizing reports. Likewise, production information can be exported into other systems.

According to the invention, data of any desired data sources can be brought together and interpreted in a freely configurable way. This allows individual production machines and entire production lines to be compared with one another, for example, to improve them on the basis of the "Golden Tool" principle.

Individual data sources can be assigned different priorities. For example, manual inputs can be given preference over automated data.

The production information generated according to the invention can be used for online monitoring and for offline reporting.

The technical implementation can take place by means of the "online machine engineering" or "OME" software package and by means of the "production status control" module or "PSC" module.

Other features which are considered as characteristic for the invention are set forth in the appended claims.

Although the invention is illustrated and described herein as embodied in a method for the hybrid-automated monitoring of production machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
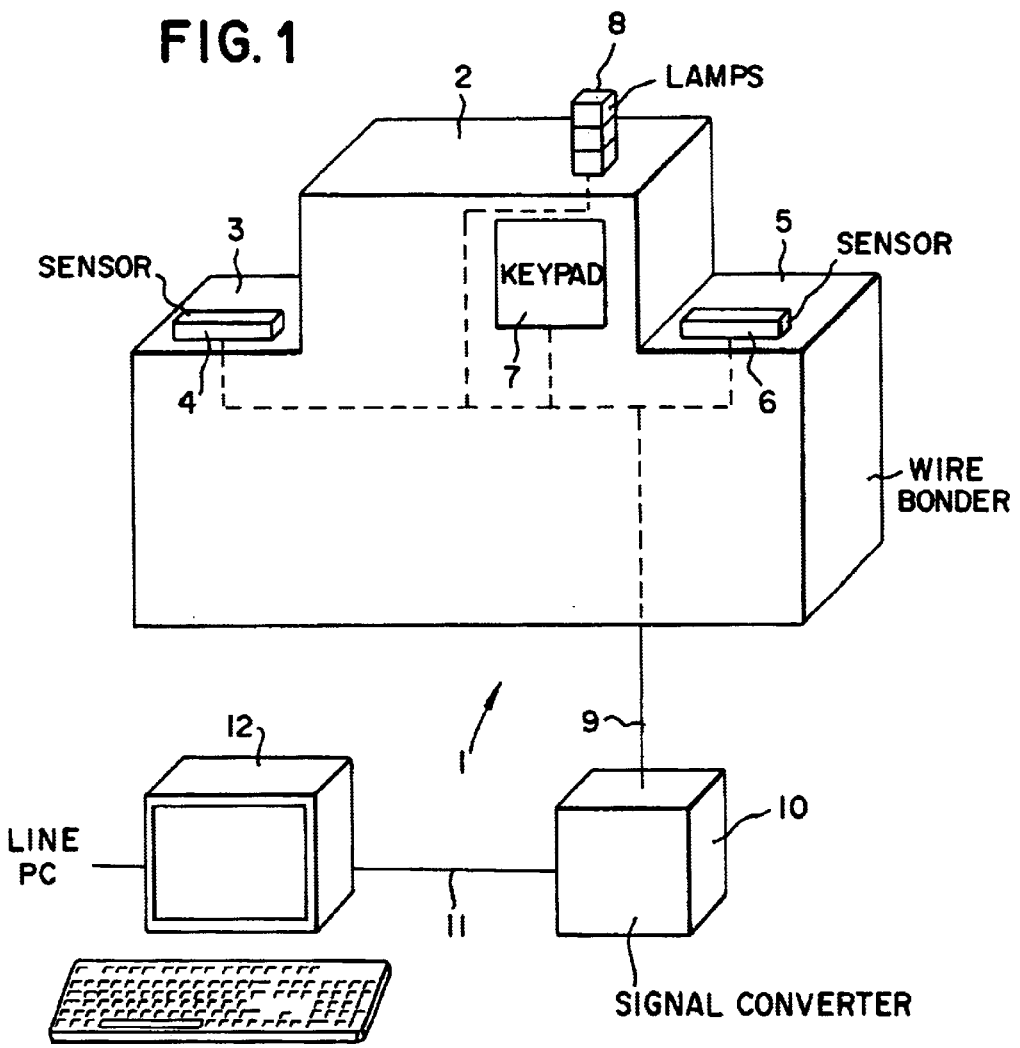
FIG. 1 schematically shows a first exemplary embodiment of a configuration including a wiring machine or wire bonder, a first data connection, a signal converter, a bus connection, and a line PC.

Referring now to the figures of the drawing in detail and first, particularly, to FIG. 1 thereof, there is shown a first exemplary embodiment of a configuration including a wiring machine or wire bonder 1, a first data connection 9, a signal converter 10, a bus connection 11 and a line PC 12.

The wire bonder 1 is divided into a working area 2, an input buffer 3, an input buffer sensor 4, an output buffer 5, an output buffer sensor 6, a keypad 7, and signal lamps 8.

The input buffer sensor 4, the output buffer sensor 6, the keypad 7 and the signal lamps 8 are connected to the signal converter 10 by the first data connection 9. The signal converter 10 is connected to the line PC 12 by the bus connection 11.

The wire bonder 1 is part of a semiconductor production line. The wire bonder 1 is intended for processing semiconductor substrates not shown here. For this purpose, in the working area 2, the wire bonder 1 wires the electrical connections of the modules that have been applied to the semiconductor substrates by a machine (not shown here) that is arranged upstream of the wire bonder 1 in the semiconductor production line.

The semiconductor substrates pass from an upstream machine via the input buffer 3 into the working area 2 of the wire bonder 1. In the working area 2, the wiring of the connections of the modules takes place. Once wiring has taken place, the semiconductor substrates are deposited in the output buffer 5 and are then passed on to a next machine (not shown here) of the semiconductor production line.

For determining and checking the operating statuses of the wire bonder 1, the input buffer sensor 4, the output buffer sensor 6, the keypad 7 and the signal lamps 8 are available as data sources.

In the first exemplary embodiment shown in FIG. 1, the signals that are electrically picked up from the input buffer sensor 4, from the output buffer sensor 6, and from the signal lamps 8, and also the data input by the operator into the keypad 7 are transmitted via the first data connection 9 to the signal converter 10.

The input buffer 3 and the output buffer 5 are respectively intended for receiving a limited number of semiconductor substrates.

The input buffer 3 is equipped with an input buffer sensor 4. Deposited in the input buffer 3 are semiconductor substrates that are intended for processing in the working area 2 of the wire bonder 1.

The sensor of the input buffer 4 shows the filling status of the input buffer 3.

The output buffer 5 has an output buffer sensor 6. Semiconductor substrates that have been processed in the working area 2 of the wire bonder 1 and that are intended for being passed on to the next machine of the semiconductor production line are deposited in the output buffer 5.

The output buffer sensor 6 shows the filling status of the output buffer 5.

The signals of the input buffer sensor 4 and also the data of the output buffer sensor 6 are electrically picked up and transmitted via the first data connection 9 to the signal converter 10. For this purpose, the signals of the input buffer sensor 4 and the signals of the output buffer sensor 6 are coded by appropriate programming.

Information can be input via the keypad 7 by an operator (not shown here). For example, an operator can input, via the keypad 7, whether or not the wire bonder 1 is to be operated or when the wire bonder 1 is being used for tests.

The link of the keypad 7 to the signal converter 10 takes place via the first data connection 9. This involves reading out data from a data bank in which the data of the keypad 7 are stored.

The signal lamps 8 have a green light, a yellow light and a red light. The respectively switched-on, switched-off, or flashing status of the signal lamps 8 signal the technical status of the wire bonder 1. The signal lamps 8 are linked to the signal converter by electrically picking up and passing signals to the signal converter 10 via a first data connection 9. Appropriate programming is used to code the data indicated by the signal lamps 8.

The signal converter 10 represents the hardware connection between the wire bonder 1 and the line PC 12. The signal converter 10 passes the data, which is picked up from the input buffer sensor 4, the output buffer sensor 6, the keypad 7 and from the signal lamps 8 of the wire bonder 1, to the line PC 12, using a bus connection 11 that is preferably a customary industrial bus connection.

A software module contained in this line PC 12 interprets the signals obtained in this way, uses an interpretation status model to assign the signals to operating statuses, and uses an evaluation status model to assign the signals to main statuses of the wire bonder 1.

The operating statuses and main statuses created in this way can be passed on to a higher-level location for monitoring the semiconductor production line.

Figure 2:
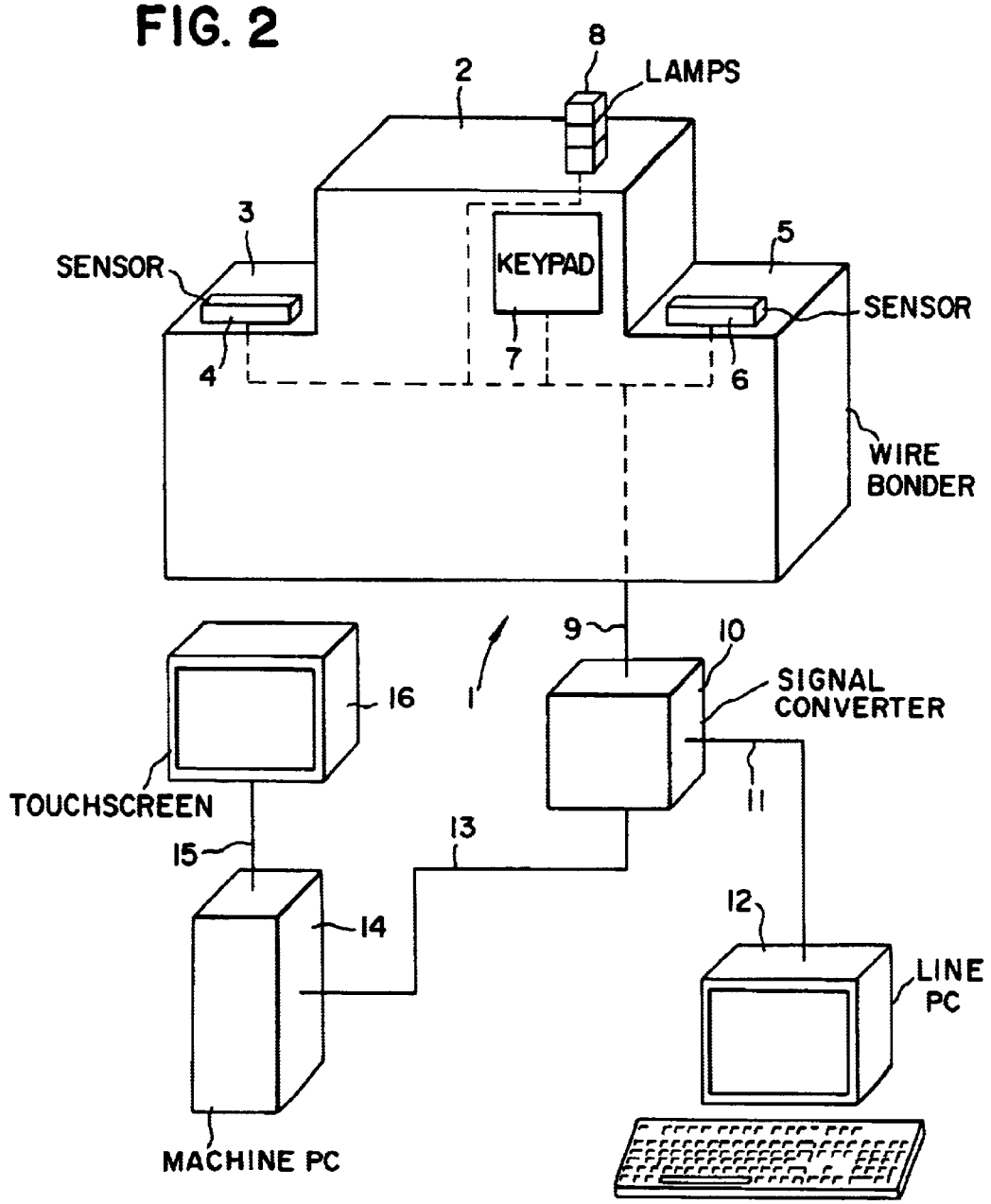
FIG. 2 schematically shows a second exemplary embodiment of a configuration including a wire bonder, a first data connection, a signal converter, a bus connection, a line PC, a second data connection, a machine PC, a third data connection, and a touch-sensitive screen or touchscreen.

FIG. 2 shows a second exemplary embodiment of a configuration including a wire bonder 1, a first data connection 9, a signal converter 10, a bus connection 11, a line PC 12, a second data connection 13, a machine PC 14, a third data connection 15, and a touch-sensitive screen or a touchscreen 16.

The construction of the wire bonder 1 and also the properties and function of all the elements of the wire bonder 1 correspond to the description specified with respect to FIG. 1.

The input buffer sensor 4, the output buffer sensor 6, the keypad 7 and the signal lamps 8 are connected to the signal converter 10 by means of a first data connection 9.

The functionality of the signal converter 10 and of the line PC 12 corresponds to the function described with respect to the configuration shown in FIG. 1.

The signal converter 10 is connected to a machine PC 14 via a second data connection 13. The machine PC 14 is connected to a touchscreen 16 with the aid of a third data connection 15.

The signal converter 10 is connected to a line PC 12 by a bus connection 11, which is preferably a customary industrial bus connection.

The configuration allows signals from the input buffer sensor 4, from the output buffer sensor 6, from the keypad 7 and from the signal lamps 8 to be transmitted to the machine PC 14 and to be made visible on the touchscreen 16.

In the exemplary embodiment, signals can be passed back from the machine PC 14 via the signal converter 10 to the wire bonder 1, for example, to the signal lamps 8. Furthermore, data of the wire bonder 1 can be transmitted via the signal converter 10 and the bus connection 11 to the line PC 12 and can be presented on the line PC 12.

On the touchscreen 16, the input possibilities can be defined by the operator. Furthermore, a multitude of further information, for example, information on the batches produced, is available on the touchscreen.

Figure 3:
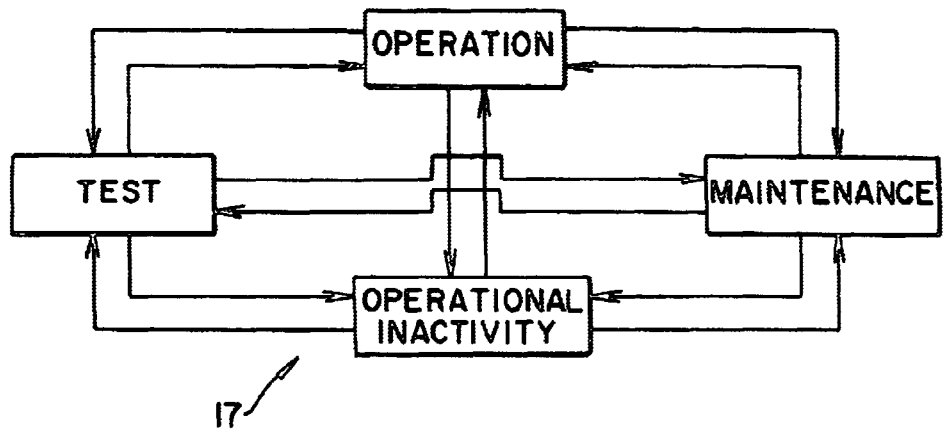
FIG. 3 schematically shows an exemplary embodiment of a keypad status model of the wire bonder shown in FIGS. 1 and 2.

FIG. 3 shows a first exemplary embodiment of a keypad status model 17 of the wire bonder 1 shown in FIG. 1 and in FIG. 2.

The keypad status model 17 has the statuses of "operation", "test", "maintenance" and "operational inactivity".

Using the keys of the keypad 7, the statuses represented as rectangles in FIG. 3, "operation", "test", "maintenance" and "operational inactivity", can be assigned to the wire bonder 1 by an operator (not shown here).

The statuses of the keypad status model 17 may have various meanings. The "operation" status can mean that the wire bonder 1 is working or that the wire bonder 1 has no material, and that the wire bonder 1 has a minor malfunction. The "test" status signals that the wire bonder 1 is being used for test purposes or that a trial run is being carried out on the wire bonder 1. The "maintenance" status indicates that repair or maintenance work is being performed on the wire bonder 1. The "operational inactivity" status means that the wire bonder 1 is temporarily not in operation.

The arrows represented in FIG. 3 between the statuses represented as rectangles respectively signal a change in status. These changes in status are caused by the operator actuating keys on the keypad 7.

From each of the statuses of "operation", "test", "maintenance" and "operational inactivity", all of the other statuses of the keypad status model 17 can be directly reached.

Figure 4:
FIG. 4 schematically shows an exemplary embodiment of a buffer sensor status model of the wire bonder shown in FIGS. 1 and 2.

FIG. 4 shows a first exemplary embodiment of a buffer sensor status model 18 of the wire bonder 1.

The buffer sensor status model 18 is identically constructed for the input buffer sensor 4 and for the output buffer sensor 6.

The buffer sensor status model 18 has the statuses "full", "free" and "empty", which are represented as rectangles in FIG. 4.

In the operation of the wire bonder 1, the statuses of the buffer sensor status model 18 can have the following meanings.

The "full" status means that the input buffer 3 or the output buffer 5 is full with semiconductor substrates and cannot receive any further semiconductor substrates. In the "full" status of the wire bonder 1, it is possible that the wire bonder 1 is in productive operation or has a malfunction.

The "free" status indicates that the number of semiconductor substrates contained in the input buffer 3 or in the output buffer 5 is greater than zero and less than the maximum amount of semiconductor substrates which can be received in the input buffer 3 or in the output buffer 5. In the "free" status, it is possible that the wire bonder 1 is in productive operation or has a malfunction.

In the "empty" status of the wire bonder 1, the number of semiconductor substrates contained in the input buffer 3 or in the output buffer 5 is equal to zero. In the "empty" status, the situation may exist that the wire bonder 1 has a malfunction or that the wire bonder 1 has an empty input buffer 3 or empty output buffer 5, or that the wire bonder 1 is idling.

The arrows represented in FIG. 4 between the statuses of the buffer sensor status model of "full", "free" and "empty" signal the respective transitions between the statuses.

From the "full" status, the "free" status can be reached. From the "free" status, it is possible to pass both into the "full" status and into the "empty" status. From the "empty" status, the "free" status can be reached.

The meanings of the statuses of "full", "free" and "empty" are identical both for the input buffer 3 and for the output buffer 5. The effects of the "full", "free" and "empty" statuses on the operation of the wire bonder 1 are different.

The "empty" status of the input buffer 3 stops the productive operation of the wire bonder 1. No semiconductor substrates can pass into the working area 2 of the wire bonder 1.

The "full" status of the output buffer 5 stops the productive operation of the wire bonder 1. The full output buffer 5 blocks the production in the working area 2 of the wire bonder 1.

Figure 5:
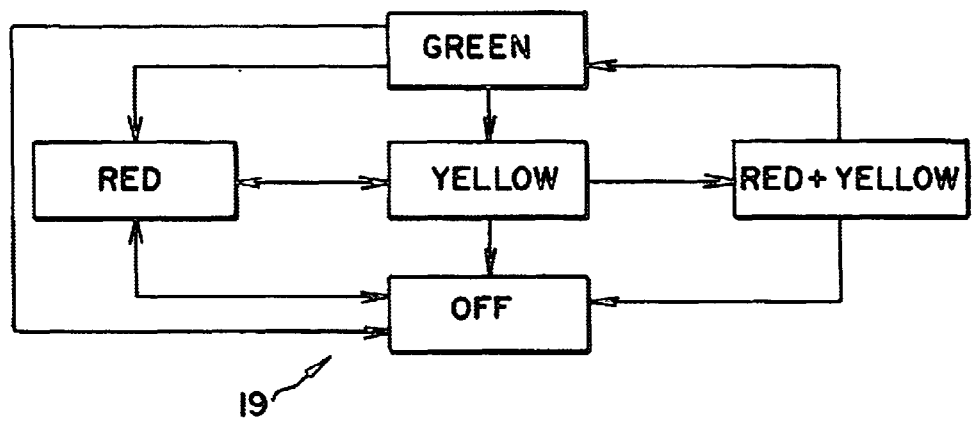
FIG. 5 schematically shows an exemplary embodiment of a signal lamp status model of the wire bonder shown in FIGS. 1 and 2.

FIG. 5 shows a first exemplary embodiment of a signal lamp status model 19.

The signal lamp status model 19 is divided into the statuses represented as rectangles in FIG. 5, "green", "red", "yellow", "off" and "red+yellow".

The "green" status indicates that the wire bonder 1 is working. In this case, it is possible for the wire bonder 1 to be in productive operation or to be resuming productive operation after an interruption.

The "yellow" status means that the wire bonder 1 is at a standstill or idling. This "yellow" status exists, for example, when the operator switches the wire bonder 1 from the previous status of "green" to idling. This "yellow" status also exists when repairs are being carried out and the previous status is "red" and the following status is "red". Furthermore, the "yellow" status is conceivable if a full output buffer 5 stops the wire bonder 1.

The "red" status indicates a fault in the operation of the wire bonder 1. This status can occur if a fault occurs in productive operation or at a standstill.

The "off" status occurs when the wire bonder 1 is switched off by the operator or when the power supply of the wire bonder 1 fails.

The "red+yellow" status occurs when the wire bonder 1 is preparing itself for the actual production process. This may be the case when the wire bonder 1 is started from idling in the "yellow" status, and when a fault is rectified and the productive operation of the wire bonder 1 is restarted.

The arrows in FIG. 5 connect the statuses represented as rectangles of the signal lamp status model 8 to one another. These arrows respectively signal a status transition between two statuses. Arrows which connect two identical statuses to each other and run in opposite directions are represented in FIG. 5 in each case as one arrow with two heads, for better clarity.

The status transitions represented in FIG. 5 by the arrows are performed during the operation of the wire bonder 1 by the machine control of the wire bonder 1.

From the "green" status, the "red" status, the "yellow" status and the "off" status can be reached. From the "yellow" status, a status transition into the "red" status, into the "off" status and into the "red+yellow" status is possible. Starting from the "red" status, it is possible to pass either into the "yellow" status or into the "off" status. Starting from the "red+yellow" status, a transition into the "green" status and into the "off" status is possible. From the "off" status, only the "red" status can be reached.

Figure 6:
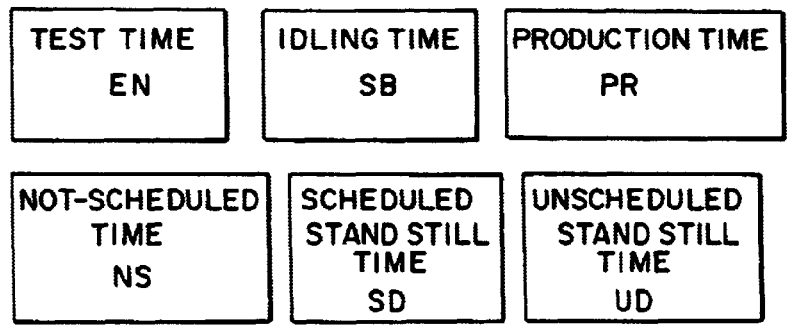
FIG. 6 schematically shows an exemplary embodiment of an evaluation status module of the main statuses of the wire bonder shown in FIGS. 1 and 2.

FIG. 6 shows a first exemplary embodiment of an evaluation status model 20.

The evaluation status model 20 is divided into the main statuses of "test time EN", "idling time SB", "production time PR", "not-scheduled time NS", "scheduled standstill time SD" and "unscheduled standstill time UD".

The main statuses of the evaluation status model 20 shown in FIG. 6 correspond to the international standard "Semiconductor Equipment and Materials International E10" or "SEMI E10". By using this evaluation status model 20, all of the operating statuses of the wire bonder 1 can be assigned to the main statuses of "test time EN", "idling time SB", "production time PR", "not-scheduled time NS", "scheduled standstill time SD" and "unscheduled standstill time UD".

The calculation of the characteristic values of the capacity utilization, reliability and availability of the wire bonder 1, such as for example "Mean Time Between Failure" or "MTBF" "Total Utilization" or "TU" and "Uptime Utilization" or "UU", are based on the exact registration of the number and accumulated duration of these main statuses of the evaluation status model 20.

Between the main statuses of the evaluation status model 20 shown in FIG. 6, any desired changes in status not shown in FIG. 6 are possible. The main statuses can be detailed in further substatuses.

Under the main status of "test time EN", all the operating statuses of the wire bonder 1 in which tests or trial runs are carried out can be subsumed. Under the main status of "idling time SB", all the operating statuses of the wire bonder 1 in which the wire bonder 1 is idling or in a waiting position can be aggregated. The main status of "production time PR" is used for registering all the operating statuses of the wire bonder 1 in which the wire bonder 1 is in productive operation and is wiring semiconductor substrates. Under the main status of "not-scheduled time NS", all the operating statuses of the wire bonder 1 in which the wire bonder 1 is in previously unscheduled operational inactivity are subsumed. The main status of "scheduled standstill time SD" covers all those operating statuses in which maintenance and repair work is carried out on the wire bonder 1. All the operating statuses in which there is a malfunction or a fault in the productive operation of the wire bonder 1 are subsumed under the main status of "unscheduled standstill time UD".

Figure 7:
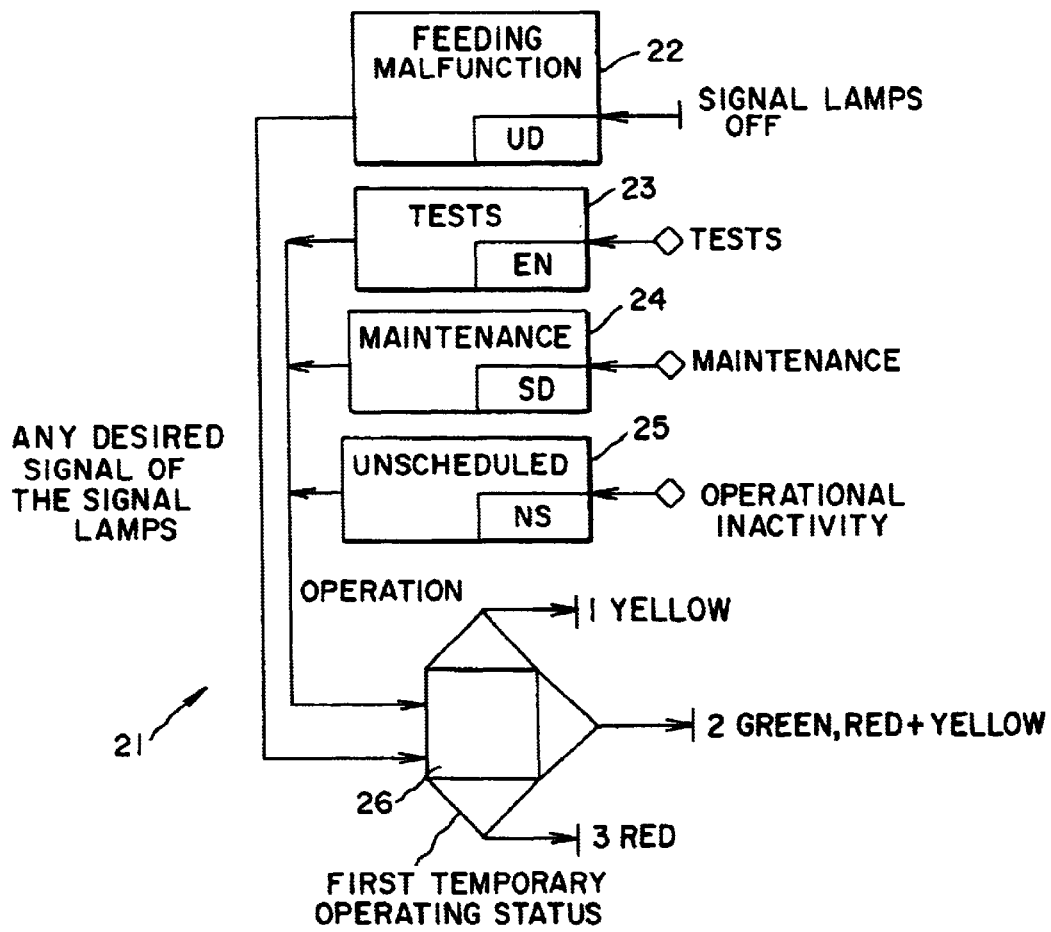
FIG. 7 schematically shows an exemplary embodiment of a first part of an interpretation status model of the operating statuses of the wire bonder shown in FIGS. 1 and 2.
Figure 8:
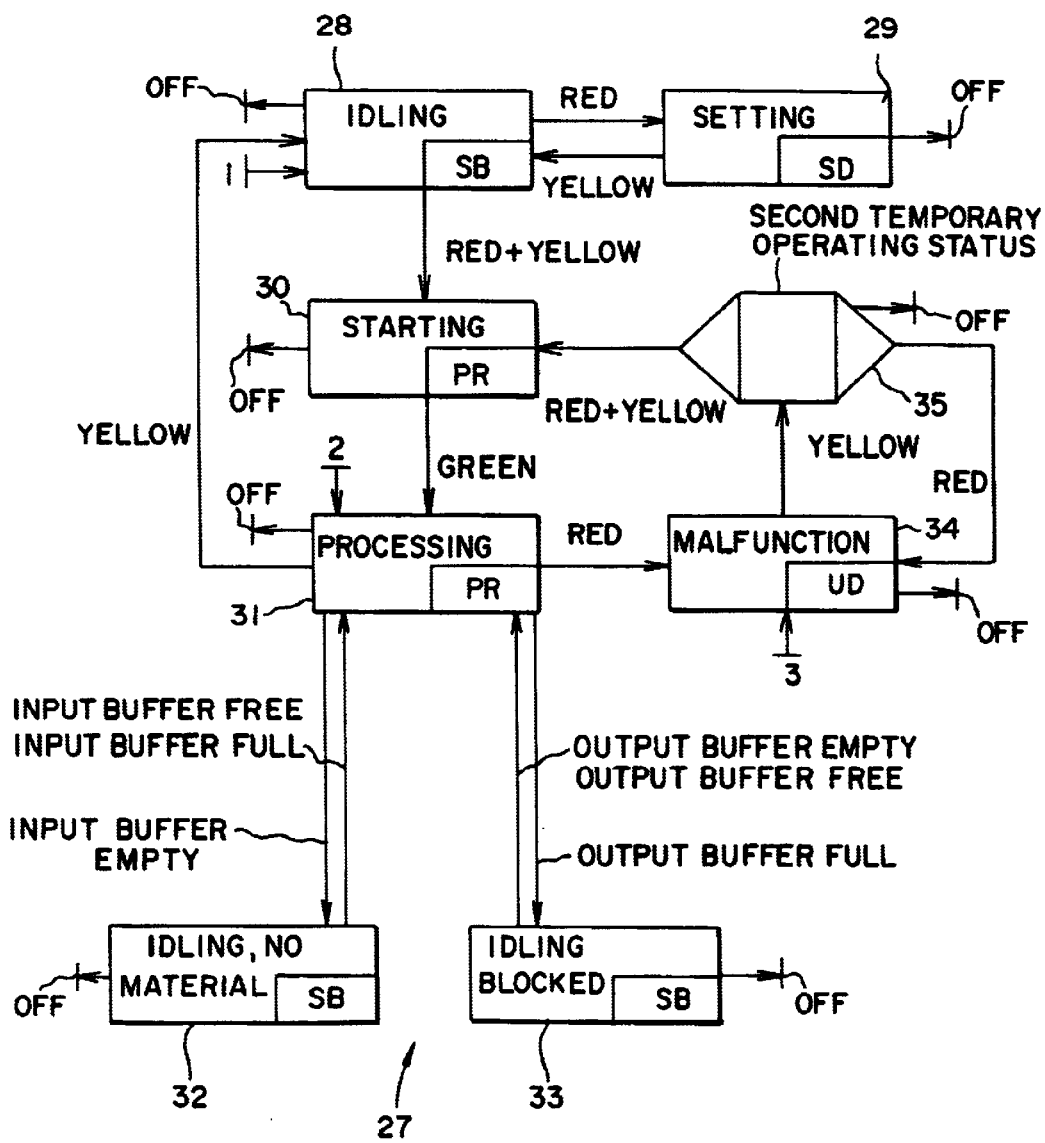
FIG. 8 schematically shows a second part of the interpretation status model of the operating statuses of the wire bonder.

The main statuses of the evaluation status model 20 of the wire bonder 1 can be determined from the statuses and the status transitions of the keypad status model 17, the buffer sensor status model 18 and the signal lamp status model 19, using an interpretation status model, which is shown in FIG. 7 and in FIG. 8.

Each main status is assigned a time account. Registered on each time account are the time periods of the main statuses of the evaluation model which the wire bonder 1 or further production machines not shown here are respectively in.

FIG. 7 shows a first exemplary embodiment of a first part of the interpretation status model 21 of the wire bonder 1.

FIG. 8 shows a second part of the first exemplary embodiment of the interpretation status model 27 of the wire bonder 1.

The first part of the interpretation status model 21 and the second part of the interpretation status model 27 have a number of operating statuses, represented as rectangles in FIG. 7 and in FIG. 8.

Each operating status in the first part of the interpretation status model 21 and in the second part of the interpretation status model 27 is assigned to a main status of the evaluation status model 20 shown in FIG. 6. Each operating status is assigned a time account.

This is respectively illustrated in FIG. 7 and in FIG. 8 of the first exemplary embodiment by the two letters which are contained in the bottom right-hand corner of the rectangles in which the operating statuses are represented.

The letters "EN", "SB", "PR", "NS", "SD" and "UD" of the respective operating statuses correspond to the main statuses of "test time EN", "idling time SB", "production time PR", "not-scheduled time NS", "scheduled standstill time SD" and "unscheduled standstill time UD" from the evaluation status model 20 shown in FIG. 6.

The operating statuses of the wire bonder 1 are connected to one another by status transitions represented as arrows in FIG. 7 and in FIG. 8.

The transitions of the operating statuses in the first part of the interpretation status model 21 and in the second part of the interpretation status model 27 are caused by the statuses and status transitions of the keypad 7 according to the keypad status model 17, by the statuses and status transitions of the input buffer sensor 4 and the output buffer sensor 6 according to the buffer sensor status model 18 and by the statuses and status transitions of the signal lamps 8 according to the signal lamp status model 19.

The first part of the interpretation status model 21 is divided into an operating status of a feeding malfunction UD 22, an operating status of tests EN 23, an operating status of maintenance SD 24, an operating status of unscheduled NS 25 and a first temporary operating status 26.

The operating status of feeding malfunction UD 22 is reached from the "signal lamps off" status. This means that the operating status of feeding malfunction UD 22 is reached immediately after the wire bonder 1 is switched on by the operator. The status of feeding malfunction UD 22 indicates that there is a fault in the supply of the wire bonder 1 with semiconductor substrates.

This may be the case, for example, if a semiconductor substrate is canted in the working area 2 of the wire bonder 1 and consequently no productive operation is possible in the working area 2. The machine control of the wire bonder 1 automatically goes into this operating status. The presence of the operating status of feeding malfunction UD 22 does not necessarily mean that there actually is a malfunction. It is a checking status in which the operating status is determined.

Starting from the operating status of feeding malfunction UD 22, the first temporary operating status 26 is reached when the following status is any desired signal of the signal lamps 8.

In the operating status of tests EN 23, maintenance and repair work are performed on the wire bonder 1 by an operator. The operating status of tests EN 23 is reached by the priority event "test" from any desired operating status. A priority event has priority over all other events. The priority event "test" is initiated by an operator from any desired operating status of the wire bonder 1 according to the interpretation status model by actuating the "test" key on the keypad 7. Starting from the operating status of tests EN 23, the first temporary operating status 26 is reached when the event "operation" is the following status. For this, the "operation" key on the keypad 7 is actuated by the operator in the operating status of tests EN 23.

In the operating status of maintenance SD 24, regular and preventive maintenance work is performed on the wire bonder 1 by an operator. The operating status of maintenance SD 24 is reached by the priority event "maintenance". This means that the operator actuates the "maintenance", key on the keypad 7 in any desired operating status. Starting from the operating status of maintenance SD 24, the first temporary operating status 26 is reached as the following status by the event "operation", i.e. by the actuation of the "operation" key on the keypad 7.

In the operating status of unscheduled NS 25, previously unscheduled repair work is undertaken on the wire bonder 1 by an operator. The operating status of unscheduled NS 25 is reached by the priority event "operational inactivity", which is initiated by the operator actuating the "operational inactivity" key on the keypad 7. As the following status of the operating status of unscheduled NS 25, the first temporary operating status 26 is reached by the event "operation". The event "operation" occurs whenever the "operation" key on the keypad 7 of the wire bonder 1 is actuated by the operator.

In the first temporary operating status 26, a different following status in each case is reached in accordance with the statuses of the signal lamps 8. Accordingly, the first temporary operating status 26 brings about branching in accordance with the respectively lighted lights of the signal lamps 8.

The first temporary operating status 26 is reached from the operating status of feeding malfunction UD 22, from the operating status of tests EN 23, from the operating status of maintenance SD 24 and from the operating status of unscheduled NS 25.

In the first temporary operating status 26, it is established which lights of the signal lamps 8 are lit up. In the case of the yellow light of the signal lamps 8 lighting up, the first temporary operating status 26 branches to the point 1 in the second part of the interpretation status model 27. In the case of the green light of the signal lamps 8 lighting up or in the case of the red and yellow lights of the signal lamps 8 both lighting up, the procedure continues at the point 2 in the second part of the interpretation status model 27. If the red light of the signal lamps 8 lights up, there follows the status transition to the point 3 in the second part of the interpretation status model 27.

The second part of the interpretation status model 27 has an operating status of idling SB 28, an operating status of setting SD 29, an operating status of starting PR 30, an operating status of processing PR 31, an operating status of idling, no material SB 32, an operating status of idling blocked SB 33, an operating status of malfunction UD 34 and a second temporary operating status 35.

The arrows which leave from the respective operating statuses and point to a vertical bar indicate that the wire bonder 1 is switched-off of from the respective operating status.

The arrows which leave from a horizontal or vertical bar having a number and pointing to an operating status symbolize a status transition from the first temporary operating status 26 of the first part of the interpretation status model 21 shown in FIG. 7.

In the operating status of idling SB 28, the wire bonder 1 is idling.

The operating status of idling SB 28 is reached by a status transition with the event "yellow" from the previous status of setting SD 29. Furthermore, the operating status of idling SB 28 is reached by a status transition with the event "yellow" from the previous status of processing PR 31. Furthermore, the operating status of idling SB 28 is reached by a status transition from the first temporary operating status 26 with the event "yellow" from the first part of the interpretation status model 21.

Starting from the operating status of idling SB 28, the operating status of setting SD 29 can be reached by the event "red". Accordingly, this status transition takes place when the red light of the signal lamps 8 lights up. The lighting-up of the red and yellow lights of the signal lamps 8 has the effect that the operating status of starting PR 30 is reached as the following status. Furthermore, the switching-off of the wire bonder 1 from the operating status of idling SB 28 is possible. This is indicated by the arrow which points to the vertical bar.

The operating status of setting SD 29 indicates that the wire bonder 1 is being run up or prepared for the production process.

The operating status of setting SD 29 is reached from the previous status of idling SB 28 by the event "red" occurring.

Starting from the operating status of setting SD 29, the following status of idling SB 28 is reached. In this case, the event "yellow" occurs. Accordingly, the yellow light of the signal lamps 8 lights up. Furthermore, switching-off of the wire bonder 1 is possible from the operating status of setting SD 29.

The operating status of starting PR 30 indicates that the wire bonder 1 is starting the production process.

The operating status of starting PR 30 is reached from the operating status of idling SB 28 by the event "red+yellow". Furthermore, the operating status of starting PR 30 is reached from the second temporary operating status 35 by the event "red+yellow".

Starting from the operating status of starting PR 30, the operating status of processing PR 31 is reached as the following status. In this case, the event "green" occurs.

This shows that the green light of the signal lamps 8 lights up. Furthermore, switching-off of the wire bonder 1 is possible from the operating status of starting PR 30.

In the operating status of processing PR 31, the wire bonder 1 is in production operation.

The operating status of processing PR 31 is reached from the first temporary operating status 26 by the event "green"

or by the event "red+yellow". This is represented in FIG. 8 by the arrow leaving from a horizontal bar, pointing to the operating status of processing PR 31 and provided with the number "2".

As a further previous status of the operating status of processing PR 31, the operating status of starting PR 30 is possible. In this case, the lighting of the green light of the signal lamps 8 is intended as the event that triggers the status transition from the operating status of starting PR 30.

Furthermore, the operating status of idling, no material SB 32 can be the status previous to the operating status of processing PR 31. In this case, the event "input buffer free" the event "input buffer full" occurs. This means that the input buffer sensor 4 indicates that the input buffer 3 has an either free or full filling status.

Furthermore, the operating status of processing PR 31 can be reached from the operating status of idling blocked SB 33. In this case, either the event "output buffer empty" or the event "output buffer free" occurs. This means that the output buffer sensor 6 reports that the output buffer 5 has either an empty or a free filling status.

As following statuses of the operating status of processing PR 31, the operating status of idling SB 28, the operating status of idling, no material SB 32, the operating status of idling blocked SB 33 and the operating status of malfunction UD 34 are possible.

In the case of the event "yellow", i.e. the lighting-up of the yellow light of the signal lamps 8, the operating status of idling SB 28 is reached as the following status.

In the case of the event "input buffer empty", the operating status of idling, no material SB 32 is reached as the following status. In this case, the input buffer sensor 4 reports that the input buffer 3 is empty.

In the case of the event "output buffer full", the wire bonder 1 goes into the operating status of idling blocked SB 33. This means that the output buffer sensor 6 registers that the output buffer 5 is full.

The event "red", i.e. the lighting-up of the red light of the signal lamps 8, has the effect that the wire bonder 1 goes into the operating status of malfunction UD 34. This means that a fault occurs in the production process.

In the operating status of idling, no material SB 32, the wire bonder 1 has an empty input buffer 3 and is accordingly idling.

The operating status of idling, no material SB 32 is reached from the operating status of processing PR 31. In this case, the event "input buffer empty" occurs, that is to say a checkback signal of the input buffer sensor 4 that the input buffer 3 is empty.

The operating status of processing PR 31 is provided as the following status of the operating status of idling, no material SB 32. This is reached by the events "input buffer free" or "input buffer full". This means that the input buffer sensor 4 indicates that the input buffer 3 is either free or full.

Furthermore, the switching-off of the wire bonder 1 is provided as the event from the operating status of idling, no material SB 32.

In the operating status of idling blocked SB 33, the output buffer 5 of the wire bonder 1 is full. Accordingly, the wire bonder 1 is idling.

The operating status of idling blocked SB 33 is reached from the operating status of processing PR 31 by the event "output buffer full". Here, the output buffer sensor 6 reports that the output buffer 5 is fully occupied and cannot receive any further semiconductor substrates.

The operating status of processing PR 31 can be the status subsequent to the operating status of idling blocked SB 33. This status is reached by the events "output buffer empty" and "output buffer free", that is to say by an indication of the output buffer sensor 6 that the output buffer 5 is either empty or free.

Furthermore, switching-off the wire bonder 1 is possible from the operating status of idling blocked SB 33.

If the operating status of malfunction UD 34 occurs, the wire bonder 1 has a malfunction or a fault in the production sequence.

The operating status of processing PR 31 represents a status previous to the operating status of malfunction UD 34. The status transition takes place by the event "red", that is to say by lighting-up the red light of the signal lamps 8.

The second temporary operating status 35 represents another status previous to the operating status of malfunction UD 34.

In this case, the event "red" occurs, that is to say lighting-up of the red light of the signal lamps 8.

Furthermore, the first temporary operating status 26 of the first part of the interpretation status model 21 according to FIG. 7 is intended as a previous status. This is identified in FIG. 8 by the number "3" and the arrow leaving from a bar and pointing to the operating status of malfunction UD 34. In this case, the event "red" occurs. Accordingly, the red light of the signal lamps 8 lights up.

As a following status, the second temporary operating status 35 is reached by the event "yellow", i.e. when the yellow lamp of the signal lamps 8 is lit.

Switching-off the wire bonder 1 is likewise intended to follow from the operating status of malfunction UD 34.

In the second temporary operating status 35, branching into the production process or into a fault status is performed in accordance with the lighting-up lights of the signal lamps 8, and a different following status is reached in each case.

The second temporary operating status 35 is called up from the operating status of malfunction UD 34 by the event "yellow", that is to say the lighting-up of the yellow lamp of the signal lamps 8.

In the case of the event "red", synonymous with the lighting-up of the red light of the signal lamps 8, the operating status of malfunction UD 34 is called up as the status following the second temporary operating status 35.

In the case of the event "red+yellow", the operating status of starting PR 30 is called up as the status following the second temporary operating status 35.

Furthermore, switching-off of the wire bonder 1 is intended to be a possible state subsequent to the second temporary operating status 35.

The determination of the operating statuses of the wire bonder 1 from the interpretation status model using the statuses of the keypad status model 17, the buffer sensor status model 18 and the signal lamp status model 19 is presented below on the basis of the first exemplary embodiment.

The statuses of the keypad status model 17, the buffer sensor status model 18 and the signal lamp status model 19 are passed on via the first data connection 9 to the signal converter 10.

The signal converter 10 transmits all the signals in real time via the bus connection 11 to the line PC 12. In the line PC 12, the operating statuses of the wire bonder 1 are determined according to the interpretation status model from the statuses of the keypad status model 17, the buffer sensor status model 18 and the signal lamp status model 19.

The operating statuses of the wire bonder 1 can be assigned to the main statuses of the evaluation status model 20.

All the operating statuses of the wire bonder 1 according to the interpretation status model are registered on the line PC 12 in the event history.

All the amounts of time which correspond to the time periods in which the wire bonder 1 is in the respective operating statuses are entered into the time account of the respective operating status. Temporary operating statuses are entered into the time account of the respective following status in the interpretation status model.

From this information, the accumulated times of the operating statuses can be determined according to the interpretation status model and the respectively corresponding main statuses according to the evaluation model. Accordingly, a precise evaluation of the operating statuses of the wire bonder 1 is possible.

At the beginning of the first exemplary embodiment, the wire bonder 1 is in the switched-off status. The signal lamps 8 are in the "off" status. Neither the input buffer sensor 4, nor the output buffer sensor 6, nor the keypad 7 emits a signal.

The operator switches on the wire bonder 1. After switching-on, the wire bonder 1 goes into the operating status of feeding malfunction UD 22.

The amount of time of the time period in which the wire bonder 1 is in the operating status of feeding malfunction UD 22 according to the interpretation status model is entered into the time account of the main status of "scheduled standstill time SD" according to the evaluation status model 20.

A machine control not shown here of the wire bonder 1 automatically establishes the technical status of the wire bonder 1, by interrogating sensors and actuators and moving to end positions. This machine control initiates in accordance with the respective technical status of the wire bonder 1 the lighting-up of the lights of the signal lamps 8 corresponding to the respective technical status according to the signal lamp status model 19.

In the present exemplary embodiment, the machine control detects that the wire bonder 1 is idling and accordingly initiates the lighting-up of the yellow light of the signal lamps 8. This lighting-up of the yellow light of the signal lamps 8 has the effect that, according to the first part of the interpretation status model 21, a status transition is performed into the first temporary operating status 26.

A status transition into the first temporary operating status 26 from the operating status of tests EN 23, from the operating status of maintenance SD 24 and from the operating status of unscheduled NS 25 is likewise possible by an operator actuating the "operation" key on the keypad 7.

A machine control (not shown here) of the wire bonder 1 automatically establishes the technical status of the wire bonder 1 after the actuation of the "operation" key. This machine control initiates, in accordance with the respective technical status of the wire bonder 1, the lighting-up of the lights of the signal lamps 8 corresponding to the respective technical status according to the signal lamp status model 19.

In the first temporary operating status 26, passing on into different following statuses takes place in accordance with the various statuses according to the signal lamp status model 19.

In the exemplary embodiment, the amount of time of the time period in which the wire bonder 1 has the first temporary operating status 26 according to the interpretation status model is assigned to the following operating status of idling SB 28 according to the interpretation status model and is entered into the time account of the corresponding main status of "idling time SB" according to the evaluation status model 20.

In the exemplary embodiment, the "yellow" status of the signal lamp status model 19 is obtained. Consequently, the interpretation status model indicates the following status denoted by 1 of the first temporary operating status 26. Accordingly, from the first temporary operating status 26, a change in status to the operating status of idling SB 28 takes place in FIG. 8 in the case of the event "yellow" of the signal lamp status model 19.

In the operating status of idling SB 28, the wire bonder 1 is idling.

In the exemplary embodiment, the amount of time of the time period in which the wire bonder 1 has the operating status of idling SB 28 according to the interpretation status model is entered into the time account of the corresponding main status of "idling time SB" according to the evaluation status model 20.

In the exemplary embodiment, at this point a malfunction occurs, which is automatically detected by the machine control and is indicated by the red light of the signal lamps 8.

Accordingly, a status change to the operating status of setting SD 29 is initiated.

In the exemplary embodiment, the amount of time of the time period in which the wire bonder 1 has the operating status of setting SD 29 according to the interpretation status model is entered into the time account of the corresponding main status of "scheduled standstill time SD" according to the evaluation status model 20.

In the operating status of setting SD 29, an operator intervention takes place. The malfunction of the wire bonder 1 is rectified by this operator intervention. After completion of the operator intervention, the operator actuates a corresponding switch or a corresponding key of the wire bonder 1. Accordingly, the machine control of the wire bonder 1 brings about the lighting-up of the yellow light of the signal lamps 8. As a result, a status transition into the operating status of idling SB 28 is brought about.

In the exemplary embodiment, the amount of time of the time period in which the wire bonder 1 has the operating status of idling SB 28 according to the interpretation status model is entered into the time account of the corresponding main status of "idling time SB" according to the evaluation status model 20.

In the operating status of idling SB 28, the operator starts the productive operation of the wire bonder 1 by actuating a corresponding switch or a corresponding key of the wire bonder 1. The machine control of the wire bonder 1 detects this and signals, by lighting up the red and yellow lights of the signal lamps 8, that the wire bonder 1 is in a self-preparation mode for the production process, in which, for example, the wire bonder interrogates the input buffer sensor 4, the output buffer sensor 6, further sensors (not shown here) and also actuators (not shown here) and moves to end positions. After this self-preparation mode, an automatic change in status into the operating status of starting PR 30 takes place.

The amount of time of the time period in which the wire bonder 1 has the operating status of starting PR 30 according to the interpretation status model is entered in the exemplary embodiment into the time account of the corresponding main status of "production time PR" according to the evaluation status model 20.

In the operating status of starting PR 30, the wire bonder 1 commences the production process. The machine control of the wire bonder 1 detects this automatically and indicates it in the form of lighting up the green light of the signal lamps 8. This event brings about a change in status into the operating status of processing PR 31.

The amount of time of the time period in which the wire bonder 1 has the operating status of processing PR 31 according to the interpretation status model is entered in the exemplary embodiment into the time account of the corresponding main status of "production time PR" according to the evaluation status model 20.

In the operating status of processing PR 31, the wire bonder 1 is in the production process.

At this point of the exemplary embodiment, a malfunction occurs in the production process. This malfunction may be caused, for example, by a substrate becoming jammed in the operating area 2 of the wire bonder 1 and by a resultant malfunction of an automatic handling unit not shown here. The machine control of the wire bonder 1 detects this malfunction automatically and passes it on in the form of lighting up the red light of the signal lamps 8. This leads to a change in status into the operating status of malfunction UD 34.

In the exemplary embodiment, the amount of time of the time period in which the wire bonder 1 has the operating status of malfunction UD 34 according to the interpretation status model is entered into the time account of the corresponding main status of "unscheduled standstill time UD" according to the evaluation status model 20.

In the operating status of malfunction UD 34, an operator intervention takes place to rectify the malfunction. After the operator intervention, the operator releases the wire bonder 1 by actuating a corresponding switch or a corresponding key to continue the production process. This is signaled by the machine control of the wire bonder 1 by the lighting-up of the yellow light of the signal lamps 8. The lighting-up of the yellow light of the signal lamps 8 has the effect that a change in status into the second temporary operating status 35 takes place.

In the exemplary embodiment, the amount of time of the time period in which the wire bonder 1 has the second temporary operating status 35 according to the interpretation status model is assigned to the following operating status of malfunction UD 34 according to the interpretation status model and is entered into the time account of the corresponding main status of "unscheduled standstill time UD" according to the evaluation status model 20.

In the second temporary operating status 35, it is automatically established by the machine control of the wire bonder 1, for example, by an interrogation of sensors not shown here, whether the malfunction that has occurred was rectified by the operator intervention or whether renewed operator intervention is necessary. In the exemplary embodiment, the machine control of the wire bonder 1 signals by the lighting-up of the red light of the signal lamps 8 that the malfunction has not been completely rectified and that renewed operator intervention is necessary. Lighting up of the red light of the signal lamps 8 has the effect that a status transition into the operating status of malfunction UD 34 takes place.

In the exemplary embodiment, the amount of time of the time period in which the wire bonder 1 has the operating status of malfunction UD 34 according to the interpretation status model is entered into the time account of the corresponding main status of "unscheduled standstill time UD" according to the evaluation status model 20.

In this operating status, a renewed operator intervention takes place to rectify the malfunction. After the renewed operator intervention, the operator gives the wire bonder 1 the signal for the production process to be resumed again in the form of actuating a switch or a key. This is indicated by the machine control of the wire bonder 1 in the form of switching on the yellow light of the signal lamps 8. This leads to a change in status into the second temporary operating status 35.

In the exemplary embodiment, the amount of time of the time period in which the wire bonder 1 has the second temporary operating status 35 according to the interpretation status model is assigned to the following operating status of starting PR 30 according to the interpretation status model and is entered into the time account of the corresponding main status of "production time PR" according to the evaluation status model 20.

It is established there by the machine control of the wire bonder 1 that the malfunction has been rectified and that no renewed operator intervention is necessary. This is signaled by the machine control of the wire bonder 1 by the lighting-up of the yellow and red lamps of the signal lamps 8. This leads to a change in status into the operating status of starting PR 30.

The amount of time of the time period in which the wire bonder 1 has the operating status of starting PR 30 according to the interpretation status model is entered in the exemplary embodiment into the time account of the corresponding main status of "production time PR" according to the evaluation status model 20.

In the operating status of starting PR 30, the wire bonder 1 resumes the production process. This is automatically established by the machine control of the wire bonder 1 and is passed on in the form of lighting up the green light of the signal lamps 8. As a result, a status transition into the operating status of processing PR 30 is initiated.

In the exemplary embodiment, the amount of time of the time period in which the wire bonder 1 has the operating status of processing PR 30 according to the interpretation status model is entered into the time account of the corresponding main status of "production time PR" according to the evaluation status model 20.

In the operating status of processing PR 30, the wire bonder 1 is working in the production process. At this point of the exemplary embodiment, the input buffer sensor 4 automatically detects the "empty" status of the input buffer 3. This means that there are no semiconductor substrates in the input buffer 3 for processing in the working area 2 of the wire bonder 1. This event causes a change in status into the operating status of idling, no material SB 32.

In the exemplary embodiment, the amount of time of the time period in which the wire bonder 1 has the operating status of idling, no material SB 32 according to the interpretation status model is entered into the time account of the corresponding main status of "idling time SB" according to the evaluation status model 20.

In this operating status, the wire bonder 1 is idling. The signal lamps continue to show lighting of the green light of the signal lamps 8. In the exemplary embodiment, a number of semiconductor substrates are then transported from the machine arranged upstream of the wire bonder 1 of the semiconductor production line into the input buffer 3 of the wire bonder 1. The input buffer sensor 4 then registers that the input buffer 3 is filled with a number of semiconductor substrates. It accordingly passes on the "free" status of the input buffer 3. This brings about a status transition to the operating status of processing PR 31.

In the exemplary embodiment, the amount of time of the time period in which the wire bonder 1 has the operating status of processing PR 30 according to the interpretation status model is entered into the time account of the corresponding main status of "production time PR" according to the evaluation status model 20.

In the operating status of processing PR 31, the wire bonder 1 is working in the production process. At this point of the exemplary embodiment, the output buffer sensor 6 detects that the output buffer 5 is full and cannot receive any further semiconductor substrates. Accordingly, a status transition into the operating status of idling blocked SB 33 takes place.

In the exemplary embodiment, the amount of time of the time period in which the wire bonder 1 has the operating status of idling blocked SB 33 according to the interpretation status model is entered into the time account of the corresponding main status of "idling time SB" according to the evaluation status model 20.

In this operating status, the wire bonder 1 is idling. The signal lamps 8 continue to show lighting of the green light. According to the exemplary embodiment, a number of the semiconductor substrates located in the output buffer S are passed on to the machine arranged downstream of the wire bonder 1 in the semiconductor production line. Accordingly, the output buffer 5 of the wire bonder 1 is no longer full. The output buffer sensor 6 detects this automatically and indicates the event "free" of the output buffer 5. This initiates a change in status into the operating status of processing PR 31.

The amount of time of the time period in which the wire bonder has the operating status of processing PR 30 according to the interpretation status model is entered in the exemplary embodiment into the time account of the corresponding main status of "production time PR" according to the evaluation status model 20.

In the operating status of processing PR 31, the wire bonder 1 is in productive operation. From this operating status, the operator switches the wire bonder 1 into the operating status of idling SB 28. The machine control detects this and indicates it in the form of lighting the yellow light of the signal lamps 8.

In the exemplary embodiment, the amount of time of the time period in which the wire bonder 1 has the operating status of idling SB 28 according to the interpretation status model is entered into the time account of the corresponding main status of "idling time SB" according to the evaluation status model 20.

From the operating status of idling SB 28, the operator switches off the wire bonder 1. The signal lamps 8 are then in the "off" status.

A multitude of evaluations are then possible by using the amounts of time entered into the time account of the evaluation statuses.

For instance, the overall time is obtained as the sum of the amounts of time entered into the time accounts of the main statuses of "test time EN", "idling time SB", "production time PR", "not-scheduled time NS", "scheduled standstill time SD" and "unscheduled standstill time UD" according to the evaluation status model 20.

For example, a characteristic productivity value can be calculated by the quotient of the amount of time entered into the time account of the main status of "production time PR" and the overall time.

We claim:

1. A method for operating a production machine in order to generate production information, which comprises:
   setting up an evaluation status model having a plurality of evaluation statuses, each one of the plurality of the evaluation statuses having precisely one respective time account corresponding thereto;
   setting up an interpretation status model having a plurality of statuses, transitions between the plurality of the statuses of the interpretation status model being established in accordance with events that can be picked up on the production machine;
   assigning the plurality of the statuses of the interpretation status model to the plurality of the statuses of the evaluation status model; and
   while operating the production machine, increasing the time account of an applicable one of the plurality of the evaluation statuses, which is applicable at a particular time, by an amount corresponding to a time period in which the production machine is in the applicable one of the plurality of the evaluation statuses.

2. The method according to claim 1, which comprises:
providing the production information as information selected from the group consisting of capacity utilization information relating to the production machine, reliability information relating to the production machine, and availability information relating to the production machine.

3. The method according to claim 1, which comprises:
   when setting up the interpretation status model, establishing the transitions between the plurality of the statuses of the interpretation status model in accordance with manual inputs of an operator of the production machine, the manual inputs of the operator being describable by a status model; and
   using the manual inputs as events of the interpretation status model.

4. The method according to claim 1, which comprises:
   when setting up the interpretation status model, establishing the transitions between the plurality of the statuses of the interpretation status model in accordance with signals from sensors in which the signals assume discrete statuses capable of being described using a sensor status model; and
   using the discrete statuses as events of the interpretation status model.

5. The method according to claim 4, which comprises:
providing the sensors as components selected from the group consisting of sensors for determining a filling status of buffer zones, sensors for measuring pressure, and indexers for measuring work progress.

6. The method according to claim 1, which comprises:
   when setting up the interpretation status model, establishing the transitions between the plurality of the statuses of the interpretation status model in accordance with operating statuses of a machine control of the production machine, the operating statuses of the machine control being describable by a status model; and
   using the operating statuses as events of the interpretation status model.

7. The method according to claim 1, which comprises:
   when setting up the interpretation status model, establishing the transitions between the plurality of the statuses of the interpretation status model in accordance with operating statuses of signal lamps of the production machine, the operating statuses of the machine control being describable by a status model; and
   using the operating statuses as events of the interpretation status model.

8. The method according to claim 1, which comprises:
   registering the plurality of the evaluation statuses of the production machine and the corresponding time accounts in a computer system connected to the production machine and storing the plurality of the evaluation statuses of the production machine and the corresponding time accounts in a time sequence for evaluation purposes.

* * * * *